(12) United States Patent
Abgrall et al.

(10) Patent No.: US 8,862,059 B2
(45) Date of Patent: Oct. 14, 2014

(54) COMMUNICATION METHOD SUPERVISED BY AN INTERFERENCE CLASSIFICATION

(75) Inventors: Cédric Abgrall, Grenoble (FR); Emilio Calvanese Strinati, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 614 days.

(21) Appl. No.: 13/189,721

(22) Filed: Jul. 25, 2011

(65) Prior Publication Data

US 2012/0021787 A1      Jan. 26, 2012

(30) Foreign Application Priority Data

Jul. 26, 2010    (FR) ...................................... 10 56115

(51) Int. Cl.
*H04B 1/00*      (2006.01)
*H04B 1/7103*    (2011.01)
*H04J 11/00*     (2006.01)

(52) U.S. Cl.
CPC ............ *H04B 1/7103* (2013.01); *H04J 11/003* (2013.01)
USPC ........................................ 455/63.1; 455/63.2

(58) Field of Classification Search
CPC ........................ H04W 28/048; H04W 28/0236
USPC ................................................ 455/63.1, 63.2
See application file for complete search history.

(56) References Cited

U.S. PATENT DOCUMENTS

| | | | |
|---|---|---|---|
| 2005/0130592 A1* | 6/2005 | Dowling ...................... | 455/63.1 |
| 2006/0188031 A1* | 8/2006 | Liu .............................. | 375/260 |
| 2006/0234633 A1* | 10/2006 | Huss ........................... | 455/63.1 |
| 2006/0292989 A1* | 12/2006 | Gerlach et al. .............. | 455/63.1 |
| 2009/0137237 A1* | 5/2009 | Nakashima et al. ........ | 455/422.1 |
| 2011/0033000 A1* | 2/2011 | Berens et al. ................ | 375/260 |
| 2011/0081864 A1* | 4/2011 | Srinivas et al. .............. | 455/63.1 |

OTHER PUBLICATIONS

Search Report issued Nov. 2, 2011 in European Patent Application No. 11 17 3772 with English translation of categories of cited documents.

Raul H. Etkin, et al., "Gaussian Interference Channel Capacity to Within One Bit: the General Case", IEEE International Symposium on Information Theory. ISIT 2007., XP031282400A, Jun. 24, 2007, pp. 2181-2185.

Syed A. Jafar, et al., "Generalized Degrees of Freedom of the Symmetric Gaussian K User Interference Channel", IEEE Transactions on Information Theory IEEE USA, XP002626019A, vol. 56, No. 7, Jun. 16, 2010, pp. 3297-3303.

Shih-Chun Chang, et al., "Coding for T-User Multiple-Access Channels", IEEE Transactions on Information Theory, vol. it-25, No. 6, Nov. 1979, pp. 684-691.

* cited by examiner

*Primary Examiner* — Wen Huang
(74) *Attorney, Agent, or Firm* — Oblon, Spivak, McClelland, Maier & Neustadt, L.L.P.

(57) ABSTRACT

The present invention relates to a communication method supervised by an interference classification. For two couples of transmitting and receiving terminals having communications using the same radio resources and interfering with each other, a partition of the interference diagram into a plurality of distinct zones is determined, each zone corresponding to a particular processing. For an operating point of the transmitting and receiving terminals, the zone in which this point is located is determined, and the processing associated with that zone is performed in at least one of the receiving terminals.

12 Claims, 6 Drawing Sheets

FIG. 6 and and # COMMUNICATION METHOD SUPERVISED BY AN INTERFERENCE CLASSIFICATION

TECHNICAL FIELD

The present invention generally relates to the field of wireless telecommunications systems and more particularly the reduction of the effects of intra-band and intercellular interference in cellular telecommunications systems.

BACKGROUND OF THE INVENTION

One of the problems affecting communication within a cellular telecommunications system is that of the interference generated by other communications of the cell or neighboring cells. A distinction is traditionally made between intercellular interference due to communication from neighboring cells and intra-cellular interference due to communications by the same cell where the terminal is located.

Many techniques have been proposed and implemented to reduce intra-cellular interference. Most of these techniques are based on an allocation of orthogonal transmission resources, for example time transmission intervals (TDMA), frequency transmission intervals (FDMA), OFDM orthogonal frequency-division multiplexing intervals (OFDMA), transmission codes (CDMA), transmission bundles (SDMA), or even a combination of such resources, so as to separate the different communications of a same cell.

Radio resources being rare, they are generally reused, at least in part, from one cell to the next. A radio resource management (RRM) module is then responsible for statically or dynamically allocating the radio resources to the different cells. It is in particular known to statically reuse radio frequencies following a bi-dimensional pattern (Frequency Reuse Pattern).

Due to the reuse of radio resources, a first communication between a first terminal and a first base station of a cell can be interfered with by a second communication, using the same radio resource, between a second terminal and a second base station of a neighboring cell. The situation is even more critical when the cells are adjacent and the terminals are on the cell border. In that case, the terminals must transmit at full power and the interference level is then higher.

For a given communication, here called first communication, the interference caused by a second communication using the same radio resource as the first is commonly called intra-band interference. In contrast, interband interference is the interference caused by a second communication using a distinct radio resource (for example a neighboring radio frequency or another radio interval) from that used by the first.

Figure 1:
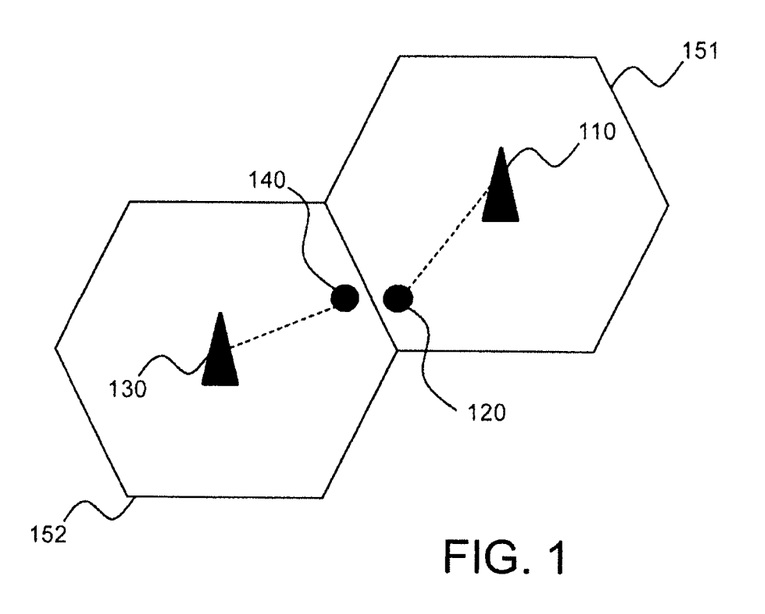
FIG. 1 diagrammatically illustrates an inter-cellular, intra-band interference situation in a cellular communication system.

FIG. 1 shows a very simplified cellular telecommunications system, comprising two cells 151 and 152. The first cell 151 contains a first couple of terminals formed by a first transmitting terminal 110 and a first receiving terminal 120. Similarly, the second cell 152 comprises a second couple of terminals formed by a second transmitting terminal 130 and a second receiving terminal 140. Terminal here refers to a mobile terminal or a base station, or even a relay terminal in the case of a relayed channel. In particular, it will be understood that here we are considering both uplink and downlink communications. It is also assumed that the first communication between the terminals 110 and 120 uses the same radio resource(s) as the second transmission between the terminals 130 and 140 so that the two communications interfere with each other.

The processing and reduction of intercellular interference have been the subject of considerable research.

The simplest processing method is to consider the interference as a simple thermal noise. This processing method is only acceptable, however, if the interference level is low. It should be noted that most power allocation algorithms are based on this hypothesis.

Other processing methods make it possible to reduce the interference by estimating the information signal of the interfering communication(s). This assumes that the considered receiving terminal knows how to decode these information signals and consequently knows the codes having been used to encode them. Known amongst these methods are in particular PIC (Parallel Interference Canceller) or serial (Successive Interference Canceller) interference reduction plans, well known by those skilled in the art.

Another traditional approach for reducing the interference level is to implement an adaptive power control method. Such a method makes it possible to monitor the power levels of the different transmitting terminals so as to guarantee a predetermined service quality to the different users. This service quality can be measured depending on the case in terms of rate, latency, packet error rates, spatial coverage, etc. Traditionally, service quality metric refers to the parameter(s) used to measure it. As a general rule, a user's communication requires a minimum service quality that is taken into account or negotiated during the procedure to admit the user into the cell. This minimum service quality is expressed in the form of a stress on the service quality metric: latency below a threshold, rate greater than a guaranteed minimum, etc. The power allocation is then done so as to comply with the stress on the service quality metric.

Lastly, the power allocation can be handled in a centralized manner (Centralized Power Allocation) by a specific network node, NC (Network Controller), or in a distributed manner (Distributed Power Allocation) within each terminal.

Reciprocally, for a given transmission power stress, it is possible to seek to maximize the rates of different users, to increase the spatial coverage of different terminals, to reduce the latency for different communications, in other words to increase the service quality for different users. In this context, the service quality is expressed in the form of a so-called utility function relative to one or more users. For example, this utility function can be the sum of the rates of the different communications (Sum-Rate) or the minimum rate (Min-Rate) on those communications.

The known methods for processing the inter-cellular intra-band interference are relatively inflexible in that they do not adapt to the interference levels affecting the different communications.

A first problem at the base of the invention is consequently to propose a communication method for a wireless telecommunications system, in which the processing of the interference is adaptive as a function of the interference level.

Another problem at the base of the invention is to provide a power allocation method or a method for maximizing a utility function that takes this adaptive processing of the interference into account.

BRIEF DESCRIPTION OF THE INVENTION

The present invention is defined by a communication method for a cellular telecommunications system comprising at least one first couple of terminals formed by a first transmitting terminal and a first receiving terminal and a second couple of terminals formed by a second transmitting terminal and a second receiving terminal, a first communication between the terminals of the first couple using the same radio resources as a second communication between the terminals of the second couple, such that the two communications interfere with each other. According to this method:

the channel coefficients are estimated between said transmitting terminals and said receiving terminals;

an interference diagram is deduced for at least the first receiving terminal, the diagram being obtained for a first transmission power range of the first transmitting terminal and a second transmission power range of the second terminal, and for at least one couple of rates for the first and second communications;

for the considered couple of rates, a partition of the diagram into different zones is determined, each zone corresponding to a distinct type of processing of the interference for at least the first communication;

a zone of the partition is selected containing an operating point of the first and second receiving terminals;

at least in the first receiving terminal, the processing is done for the interference corresponding to the zone thus selected. Advantageously:

In the first type of processing, the interference is processed as thermal noise to decode said information signal of the first communication.

In the second type of processing, the information signals of the first and second communications are the subject of joint decoding.

In the third type of processing, the information signal of the second signal is decoded first, an estimate of the interference signal due to the second communication is deduced therefrom and it is subtracted from the signal received by the first receiver, the information signal of the first communication being decoded from the signal thus obtained.

Said operating point can be obtained by minimizing the power allocated to the first transmitting terminal for a given rate of the first communication.

Alternatively, said operating point is obtained by joint minimization of the powers respectively allocated to the first and second transmitting terminals, under a stress pertaining to a first service quality metric. In particular, said operating point is obtained by joint minimization of the powers respectively allocated to the first and second transmitting terminals for given rates of the first and second communications.

A plurality of partitions can first be determined, said zone then being obtained by selecting the one of said partitions maximizing, at the operating point, a utility function depending on the rate of the first communication.

Alternatively, a plurality of partitions is determined, said zone then being obtained by selecting that of said partitions maximizing, at the operating point, a utility function jointly depending on the respective rates of the first and second communications. Said utility function can be the sum of the rates of the first and second communications, or a minimum rate for the first and second communications.

In one embodiment, said communication system comprises a plurality of couples each formed by a transmitting terminal in communication with a receiving terminal and the couples are grouped together in pairs by selecting, for each first couple of terminals, a second couple of terminals of said plurality generating the strongest interference level on the communication between the terminals of the first couple, the first couple of terminals and the second couple of terminals then constituting a pair.

BRIEF DESCRIPTION OF THE DRAWINGS

Other features and advantages of the invention will appear upon reading one preferred embodiment of the invention, done in reference to the attached figures, in which.

DETAILED DESCRIPTION OF THE INVENTION

We hereafter consider a cellular communication system comprising a plurality of pairs of transmitting terminals and receiving terminals. As before, we will assume that the different communications can be affected by an intra-band interference. The wireless communication system can, for example, be a cellular communication system or an ad hoc communication system.

To simplify the presentation, we will first look at the case of a system having only two pairs of terminals, as illustrated in FIG. 1.

Figure 2:
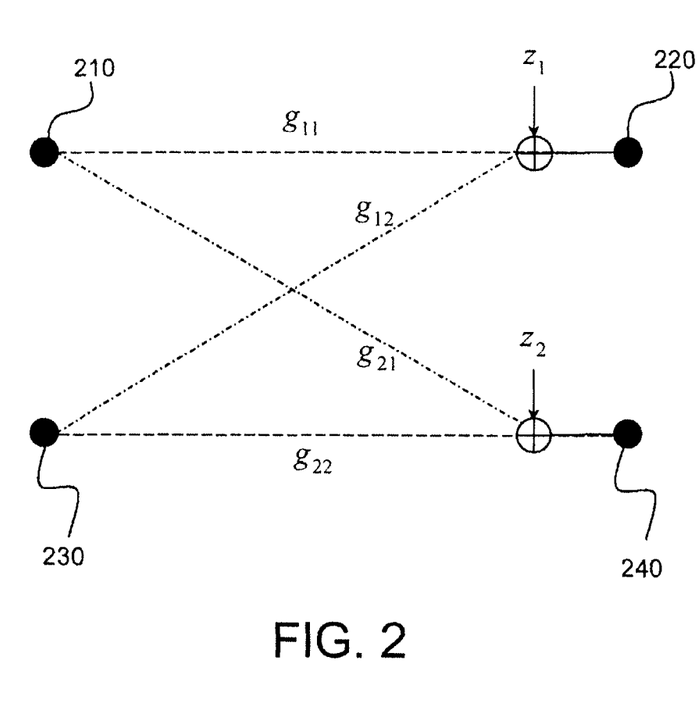
FIG. 2 diagrammatically illustrates a model of the cellular communication system of FIG. 1.

FIG. 2 shows a model of the telecommunications system of FIG. 1.

If $x_1$, $x_2$ respectively denote the signals sent by the transmitting terminals 210 and 230 and $y_1$, $y_2$ denote the signals respectively received by the receiving terminals 220 and 240, we have:

$$y_1 = g_{11}x_1 + g_{12}x_2 + z_1$$

$$y_2 = g_{21}x_1 + g_{22}x_2 + z_2 \qquad (1)$$

where $z_1, z_2$ are Gaussian white noise samples $g_{11}, g_{21}$ are the channel coefficients between the transmitting terminal 210 and the receiving terminals 220 and 240, respectively, and $g_{22}, g_{12}$ are the channel coefficients between the transmitting terminal 230 and the receiving terminals 240 and 220, respectively.

It will be understood that the interference between communications is represented in (1) by the crossed terms.

For the first communication, the respective powers of the information and interference signal due to the second communication are respectively $|g_{11}|^2 P_1$ and $|g_{12}|^2 P_2$.

It will be noted that this model is similar to the traditional two-user multi-access channel model called MAC (Multiple Access Channel) as for example described in the article by Shih-Chun Chang et al. entitled "Coding for T-User Multiple-Access Channels," IEEE Transactions on Information Theory, vol. IT-25, no. 6, pp. 684-691, November 1979.

It fundamentally differs from the aforementioned article, however, inasmuch as in the MAC model, the receiving terminals receive useful information and not interference information on the "crossed" channels.

The signal to noise ratio (SNR) at the first receiver can be expressed in the form:

$$\gamma_1 = |g_{11}|^2 \frac{P_1}{N_0} \qquad (2)$$

Similarly, the interference to noise ratio at the first receiver is none other than:

$$\delta_1 = |g_{12}|^2 \frac{P_2}{N_0} \quad (3)$$

Likewise, the signal to noise and interference to noise ratios at the second receiver can respectively be written as:

$$\gamma_2 = |g_{22}|^2 \frac{P_2}{N_0} \quad (4)$$

$$\delta_2 = |g_{21}|^2 \frac{P_1}{N_0} \quad (5)$$

It will be noted that the following relationships are verified:

$$\delta_1 = f_2 \gamma_2 \text{ and } \delta_2 = f_1 \gamma_1 \quad (6)$$

where $$f_1 = \frac{|g_{21}|^2}{|g_{11}|^2} \text{ and } f_2 = \frac{|g_{12}|^2}{|g_{22}|^2}. \quad (6')$$

Hereinafter $\rho_1$ and $\rho_2$ will denote the respective rates on the first and second communications and the variables $C_1 = 2^{\rho_1} - 1$, $C_2 = 2^{\rho_2} = 1$ and $C_{12} = 2^{\rho_1 + \rho_2} - 1$ are introduced.

For a given pair of rates $(\rho_1, \rho_2)$, it is possible to distinguish several interference regimes, each regime giving rise to separate processing. More precisely, if one considers the first communication, it is possible to classify the interference in three possible regimes:

Diagrammatically, in a first regime, the power of the interference due to the second communication is lower than the power of the information signal received at the first receiving terminal. More precisely, if one reasons in terms of capacity within the meaning of Shannon, the signal to noise plus interference ratio on the direct channel between the transmitting terminal 210 and the receiving terminal 220 makes it possible to pass the rate $\rho_1$ whereas the signal to noise ratio on the "crossed" channel between the transmitting terminal 230 and the receiving terminal 220 does not make it possible to pass the rate $\rho_2$ (the "crossed" channel is in a cutoff situation within the meaning of the information theory), in other words:

$$\rho_1 \leq \log_2(1 + SINR_{11}) = \log_2\left(1 + \frac{\gamma_1}{1 + \delta_1}\right) \quad (7)$$

and $$\rho_2 > \log_2(1 + INR_{12}) = \log_2(1 + \delta_1) \quad (8)$$

where $SINR_{11}$ and $INR_{12}$ are respectively the signal to noise plus interference ratio and the interference to noise ratio at the first receiving terminal.

In this regime, the information signal of the second communication cannot be decoded due to the cutoff of the crossed channel. It is then considered thermal noise for decoding the information signal of the first communication.

The stresses on $\delta_1$ and $\gamma_1$ relative to the first regime are deduced from (7) and (8):

$$\gamma_1 \geq C_1(1 + \delta_1) \quad (9)$$

$$\gamma_1 < C_2 \quad (2)$$

Conversely, in a third regime, the power of the interference is substantially greater than that of the information signal received by the first receiving terminal. Given that the interference is due to the second communication, it is proposed to first decode the information signal of the second communication, to estimate the interference due to this communication, and to subtract it from the received signal. The information signal of the first communication is then decoded from the resulting signal, rid of the interference.

In this regime, in a first step one considers the signal from the first communication as thermal noise and decodes the information signal of the second communication. One is therefore in a situation symmetrical to that of the first regime and expression (7) is replaced by:

$$\rho_2 \leq \log_2(1 + SINR_{12}) = \log_2\left(1 + \frac{\delta_1}{1 + \gamma_1}\right) \quad (11)$$

where $SINR_{12}$ is the "signal to noise" ratio at the receiving terminal 220 in which the signal is heard as the information signal of the second communication.

In a second step, once the contribution of the second communication is subtracted from the received signal, one is in the case of a signal simply noised by a thermal noise, in other words:

$$\rho_1 \leq \log_2(1 + SNR_{11}) = \log_2(1 + \gamma_1) \quad (12)$$

where $SNR_{11}$ is the signal to noise ratio after elimination of the interference due to the second communication.

Expressions (11) and (12) translate to the following stresses on $\gamma_1$ and $\delta_1$:

$$\gamma_1 \leq \frac{\delta_1}{C_2} - 1 \quad (13)$$

and $$\gamma_1 \geq C_1 \quad (14)$$

Lastly, in a second regime, the power of the interference is of the same order as that of the information signal. It is then proposed to jointly decode the information signal of the first communication and the information signal of the second communication at the first receiving terminal. The joint decoding of the two information signals may, for example, be done using a PIC system or a maximum likelihood decoding method of the MMSE-GDFE (Minimum Mean Square Error-Generalized Decision Feedback Equalizer) type, in a known manner.

This interference regime is intermediate between the first and third inasmuch as the rate $\rho_2$ no longer verifies (8) and (11), in other words:

$$\log_2\left(1 + \frac{\delta_1}{1 + \gamma_1}\right) < \rho_2 \leq \log_2(1 + \delta_1) \quad (15)$$

However, the joint decoding assumes that the rates of the first and second communications can be conveyed by the channel made up of the direct channel and the crossed channel, i.e.:

$$\rho_1 + \rho_2 \leq \log_2(1 + \gamma_1 + \delta_1) \quad (16)$$

The stresses on $\gamma_1$ and $\delta_1$, relative to the second regime, are deduced from (15) and (16):

$$C_2 \le \delta_1 < C_2(1+\gamma_1) \qquad (17)$$

and $$\gamma_1 \ge C_{12} - \delta_1 \qquad (18)$$

Figure 3:
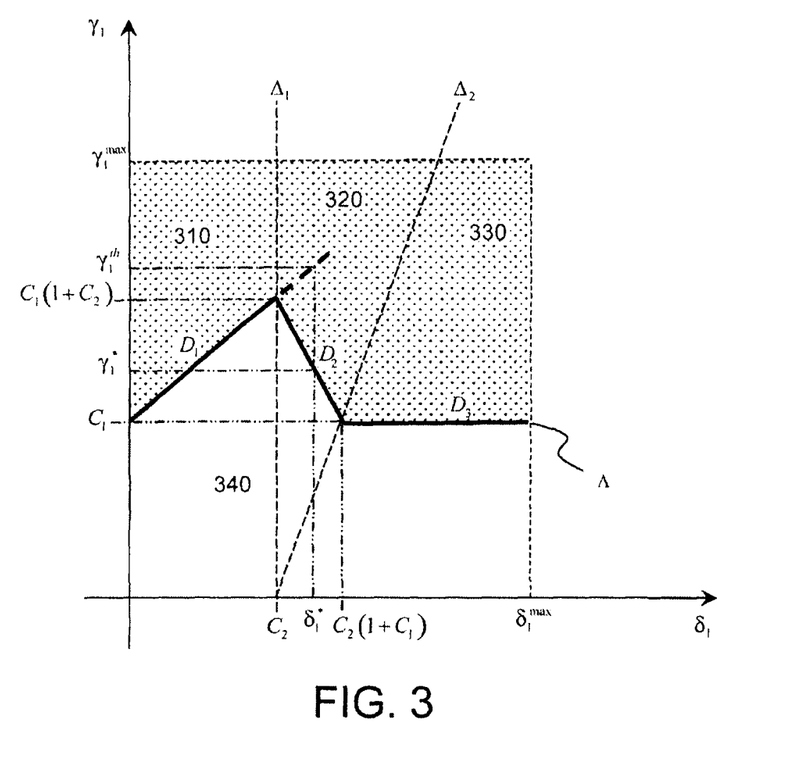
FIG. 3 diagrammatically illustrates a first interference diagram for a first communication.

FIG. 3 shows an interference diagram in which the x-axis shows the interference to noise ratio $\delta_1$ and the y-axis shows the power to noise ratio $\gamma_1$.

This diagram is obtained for given rate values $\rho_1$ and $\mu_2$, and as a result for the given values of $C_1$, $C_2$, $C_{12}$.

The ratio $\gamma_1$ varies from 0 to $\gamma_1^{max} = |g_{11}|^2 P_1^{max}/N_0$ and the ratio $\delta_1$ varies from 0 to $\delta_1^{max} = |g_{12}|^2 P_2^{max}/N_0$ where $P_1^{max}$ and $P_2^{max}$ are respectively the maximum transmission powers of the terminals 210 and 230.

The lines $\Delta_1$ and $\Delta_2$ defined by the equations $\delta_1 = C_2$ (cf. (10)) and $$\gamma_1 = \frac{\delta_1}{C_2} - 1 \text{ (cf. (13))}$$

delimit the three interference regimes. The lines $D_1$, $D_2$, $D_3$, respectively defined by the equations $\gamma_1 = C_1(1+\delta_1)$ (cf. (9)); $\gamma_1 = C_{12} - \delta_1$ (cf. (18)); $\gamma_1 = C_1$ (cf. (14)); give the lower power border, noted $\Lambda$, for each of these regimes. The zone 310 corresponding to the first interference regime is delimited by the lines $D_1$ and $\Delta_1$ as well as the ordinate axis, that corresponding to the second interference regime, 320, is delimited by the lines $\Delta_1$, $\Delta_2$ and $D_2$, and lastly that 330 corresponding to the third interference regime is delimited by $\Delta_2$ and $D_3$.

Below the lower border $\Lambda$ is a fourth zone 340 in which it is not possible to process the interference for the requested service quality, here for the rates $\rho_1$ and $\rho_2$. It may then be possible to use another radio resource, for example another transmission time interval to eliminate the interference between the two communications.

If the rate of the first or second communication varies, the parameters of the equations of the lines $D_1$, $D_2$, $D_3$ and $\Delta_1$, $\Delta_2$ also vary and, as a result, the zones corresponding to the different interference regimes are modified.

For the given rates $\rho_1$ and $\rho_2$, it is possible to determine, from an estimate, at the receiver, the power of the information signal, the power of the interference and that of the thermal noise, in which interference regime one is located, and to perform the processing related to said zone.

Moreover, as indicated in the figure, for given rates $\rho_1$ and $\rho_2$, it is possible to determine, for each interference power $\delta_1$, the lowest value of designated here by $\gamma_1^*$, making it possible to process said interference. In other words, for a given transmission power of the terminal 230, it is possible to allocate the minimum power $$P_1^* = \frac{N_0}{|g_{11}|^2} \gamma_1^*.$$

to the transmitting terminal 210. It will be noted that if one is in the zone 320 or 330, this allocated power value is much lower than that, designated here by $\gamma_1^{th}$, that it would have been necessary to allocate if one had likened the interference to simple thermal noise.

Figure 4:
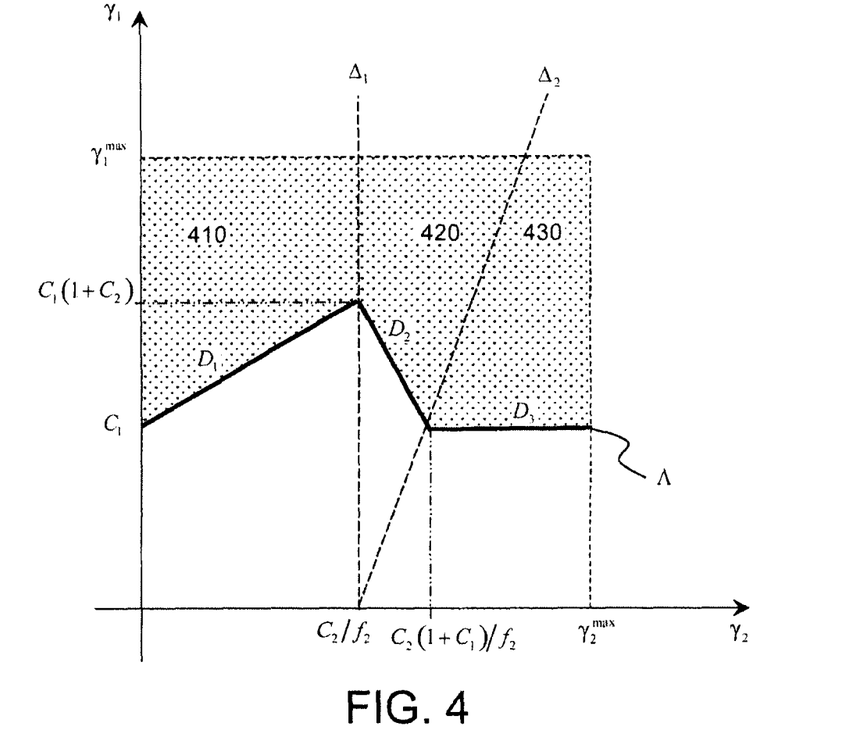
FIG. 4 diagrammatically illustrates a second interference diagram for this same communication.

FIG. 4 shows an interference diagram in which this time the x-axis shows the power to noise ratio $\gamma_2$ and the y-axis shows the power to noise ratio $\gamma_1$.

The ratio $\gamma_1$ varies from 0 to $\gamma_1^{max} = |g_{11}|^2 P_1^{max}/N_0$ and the ratio $\gamma_2$ varies from 0 to $\gamma_2^{max} = |g_{22}|^2 P_2^{max}/N_0$.

Inequalities (9), (13) and (18) can be rewritten as a function of the ratios $\gamma_1$ and $\gamma_2$, using (6):

$$\gamma_1 \ge C_1(1 + f_2 \gamma_2) \qquad (19)$$

$$\gamma_1 \le \frac{f_2}{C_2} \gamma_2 - 1 \qquad (20)$$

$$\gamma_1 \ge C_{12} - f_2 \gamma_2 \qquad (21)$$

Similarly to FIG. 3, the lines $\Delta_1$ and $\Delta_2$ defined by the equations $\gamma_{72} = C_2/f_2$ (cf. (10)) and $$\gamma_1 = \frac{f_2}{C_2} \gamma_2 - 1 \text{ (cf. (20))}$$

delimit the three interference regimes and the lines $D_1$, $D_2$, $D_3$, respectively defined by the equations $\gamma_1 = C_1(1+f_2\gamma_2)$ (cf. (19)); $\gamma_1 = C_{12} - f_2\gamma_2$ (cf (21)); $\gamma_1 = C_1$ (cf. (14)); provide the lower power boundary $\Lambda$. The zones corresponding to the different interference regimes are designated by 410, 420 and 430.

Figure 5:
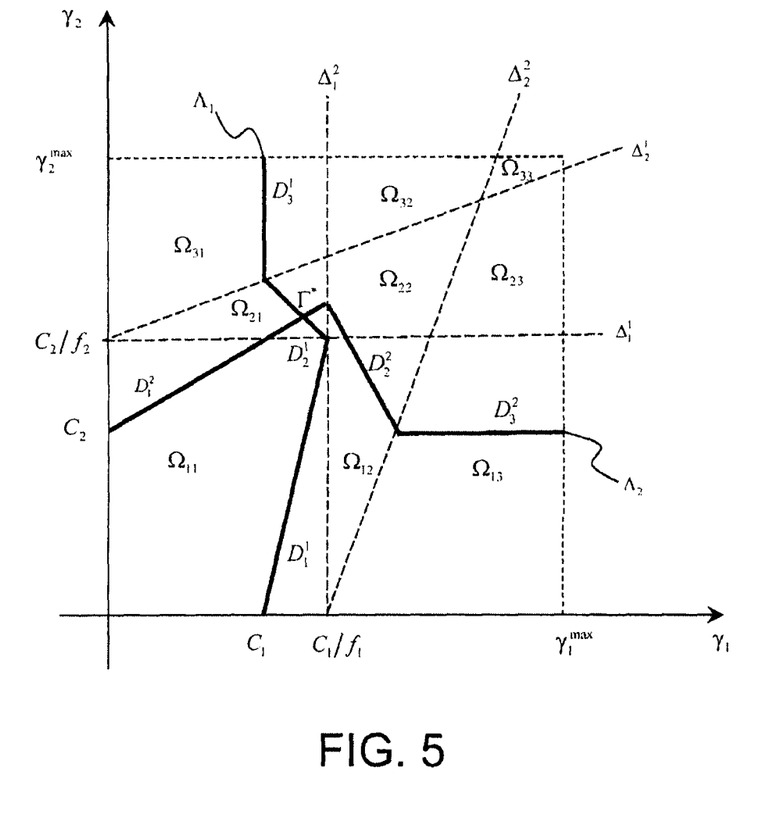
FIG. 5 diagrammatically shows an interference diagram for first and second communications.

FIG. 5 shows an interference diagram identical to that of FIG. 4 in which the different interference regimes are indicated for both communications. The signal to noise ratio $\gamma_1$ is shown on the x-axis and the signal to noise ratio $\gamma_2$ on the y-axis. Nine distinct zones are obtained by the intersection of three zones relative to the first communication and three zones relative to the second communication. These nine zones are denoted $\Omega_{pq}$, $1 \le p \le 3$, $1 \le q \le 3$, where p and q respectively index the interference regime of the first and second communications. The different zones are delimited by the lines $\Delta^1_1, \Delta^1_2, \Delta^2_1, \Delta^2_2, D_1^1, D_2^1, D_3^1$, and $D_1^2, D_2^2, D_3^2$ where the upper index here indicates the communication.

The lower borders $\Lambda_1$ and $\Lambda_2$ relative to the two communications intersect at a point $\Gamma^* = (\gamma_1^*, \gamma_2^*)$. For given communication rates $\rho_1$ and $\rho_2$, the point $\Gamma^*$ corresponds to the minimum power allocation. In general, the zone $\Omega_{p^*q^*}$ in which the point $\Gamma^*$ is located provides the interference regimes $p^*, q^*$ for the two communications and as a result the types of processing to be done at the corresponding receiving terminals. It will be noted that in the illustrated case, it is the zone $\Omega_{21}$ that contains the operating point, in other words for decoding the information signal of the first communication, one will proceed with a joint decoding (at the first receiving terminal), and for decoding the information signal of the second communication (at the second receiving terminal), the first communication will be likened to thermal noise.

Conversely, for given transmission powers, it is possible to determine the maximum rates $\rho_1^*$ and $\rho_2^*$ allowing the interference processing. In fact, this amounts to looking for the couple of lower boundaries $\Lambda_1^*$ and $\Lambda_2^*$ whereof the point $\Gamma = (\gamma_1^*, \gamma_2^*)$ is the intersection. The zone where the point $\gamma = (\gamma_1^*, \gamma_2^*)$ is located also provides the types of interference processing as previously described.

More generally, for given transmission powers, it is possible to seek to optimize a function of interest $f(\rho_1, \rho_2)$, jointly depending on the rates of the first and second communications. For example, it is possible to seek to maximize the sum of the rates (Sum Rate Scheduling) or to guarantee a minimum rate (Min Rate Scheduling) or rates proportional to the connection quality (Fair Rate Scheduling).

Lastly, it will be understood that other functions of interest could be optimized similarly from the interference diagram. The function of interest in question may in particular depend on other service quality parameters such as the latency time on communications or the spatial coverage of the terminals.

Whatever the form, the maximization of the function of interest on the interference diagram, for given transmission powers, makes it possible to obtain the optimal values of the service quality parameters.

Figure 6:
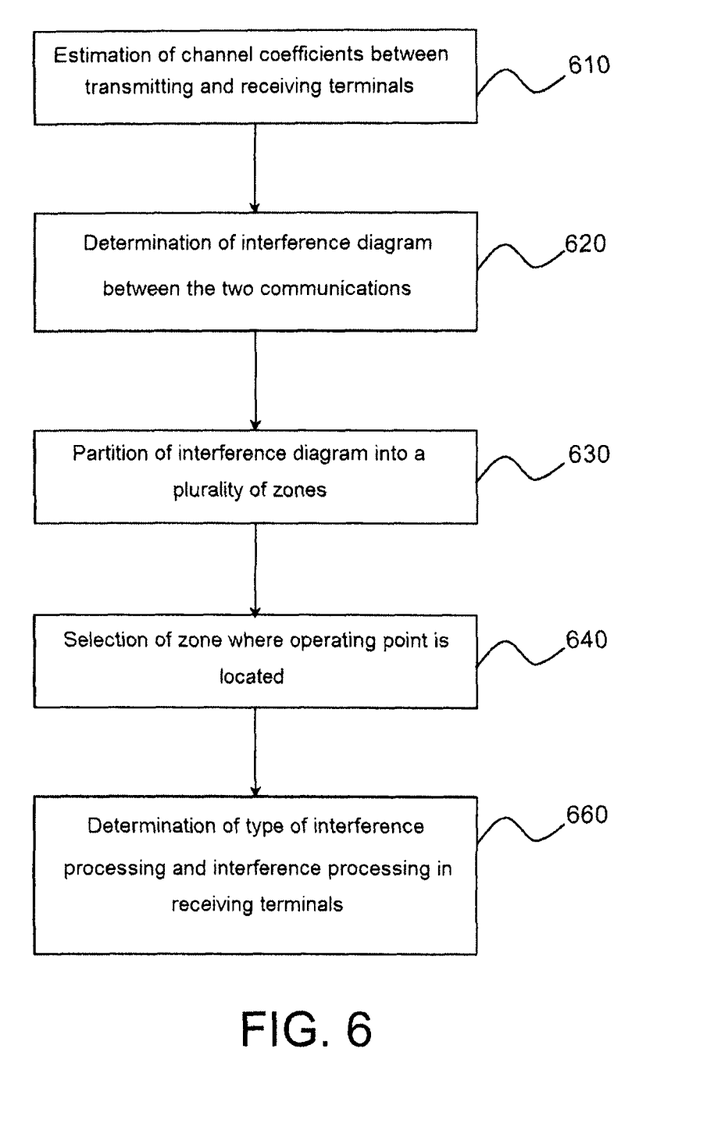
FIG. 6 diagrammatically shows a flowchart of a communication according to one embodiment of the invention.

FIG. 6 diagrammatically illustrates a flowchart of the communication method according to one embodiment of the invention.

This embodiment assumes that two couples of transmitting and receiving terminals of the wireless telecommunications system have previously been selected because their communications use the same radio resources and interfere with each other (intra-band interference).

In step 610, the channel coefficients $g_{mn}$, m=1,2 are estimated; n=1,2; between the transmitting terminals and the receiving terminals, for example using pilot symbols, in a known manner.

In step 620, for a transmission power range $[P_1^{min}, P_1^{max}]$ of the first transmitting terminal, a transmission power range $[P_2^{min}, P_2^{max}]$ of the second transmitting terminal, and at least one pair of rate values of the first and second communications, an interference diagram $(\delta_1, \gamma_1)$ or $(\gamma_2, \gamma_1)$ is determined from the previously estimated coefficients, $\hat{g}_{mn}$, for at least the first communication or even for both communications.

In step 630, one determines, for at least the first communication, a partition of the interference diagram into a plurality of separate zones. An interference processing is associated with each of these zones.

Advantageously, the partition will be used in three zones, as previously described.

In the first zone, the interference due to the second communication is of low power relative to the information signal of the first communication. The interference is then processed as thermal noise for decoding this information signal.

In the second zone, the interference due to the second communication is of the same power order as the information signal of the first communication. One then proceeds with joint decoding of the information signals of the two communications.

Lastly, in a third regime, the interference due to the second communication has a power substantially greater than that of the information signal of the first communication. The information signal of the second communication of the received signal is then first decoded, said interference is estimated from the signal thus decoded (and the channel coefficient $g_{12}$). The estimated interference is subtracted from the received signal to generate a signal rid of interference. Lastly, the information signal of the first communication is decoded from the latter signal.

As indicated above, it is possible to proceed with a partition of the interference diagram both for the first and second communications. Generally, one then obtains a partition in $P^2$ distinct zones $\Omega_{ij}$ where P is the number of interference regimes for a single communication.

In practice, the different zones are delimited by the lines $\Delta_q^k$ and $D_s^k$, q=1,2, s=1, 2, 3 where k=1,2 is the index of the communication.

In step 640, the zone is selected where the operating point of the first receiving terminal is found, for example given by the signal to noise and interference to noise ratio at that terminal.

This operating point can be obtained in different ways.

First, it can be determined by the receiving terminal from an estimate of the respective powers of the information signal, the interference and the thermal noise. These powers can for example be obtained by providing periods of silence in the first and second communications, the thermal noise being measured during a period of silence for the two communications. The thermal noise can also be measured using sequences of pilot symbols.

Alternatively, the operating point can be provided directly by a power reference for the transmitting terminals. The powers of the information and interference signal, at the receiving terminal, are then calculated from the channel coefficients.

The operating point can also be determined using a minimum power allocation method. In that case, the allocated powers are obtained by the intersection of the curves $\Lambda_1$ and $\Lambda_2$, as seen above.

Reciprocally, for a given operating point $\Gamma$, it is possible to look for the rates $\rho_1^*, \rho_2^*$ maximizing a utility function $f(\rho_1, \rho_2)$ at the operating point. The rates $\rho_1^*, \rho_2^*$ then determine a partition of the interference diagram, since the equations of the lines $\Delta_q^k$ and $D_s^k$ depend on them.

In step 650, the zone thus selected is used to deduce the type of processing of the interference (i*,j*) to be done at the first and/or second receiver(s) and the processing is done in the receiver depending on the selected type.

The communication method according to the invention is generalized to any number K of pairs of terminals and therefore a number K of corresponding communications. The interference diagram of FIG. 4 or 5 is then built in a space with K≥2 dimensions and one has $P^K$ possible combinations of P interference regimes for the set of K communications of the system.

Since this number can be very high, one can opt for a sub-optimal solution that is easier to implement.

According to this solution, the couples of transmitting and receiving terminals $T_k=(E_k,R_k)$, k=1, ..., K are selected one by one where $E_k$ is a transmitting terminal in communication with a receiving terminal $R_k$. For a couple $T_k$, one looks for the couple $T_{k'}$ whereof the communication k' causes the strongest level of interference on the communication k. One then groups $T_k$ and $T_{k'}$ in the form of a pair. The method continues with the remaining terminals until all of the couples $T_k$ are paired up, with the exception of one if K is odd.

Advantageously for a given couple $T_k$, the search for the couple $T_{k'}$ causing the high level of interference can be done by comparing the channel coefficient ratios $$\tilde{f}_k^{k'} = \frac{|g_{kk'}|}{|g_{kk}|}$$

where $g_{kk'}$ is the coefficient of the "crossed" channel between $E_{k'}$ and $R_k$ and $g_{kk}$ is the coefficient of the direct channel between $E_k$ and $R_k$. The selected couple $T_{k'}$ is that corresponding to the highest ratio $\tilde{f}_k^{k'}$.

For a pair $(T_k, T_{k'})$ thus formed, it is possible to consider that the other pairs are only slightly interfering. The "residual" interference due to the other communications will be processed as thermal noise and consequently will not influence the choice of the type of processing of the interference for the communication k.

Once the interference diagram is determined for the pair $(T_k, T_{k'})$ and the zones of the different identified interference regimes, a minimum power allocation can be done complying with a stress on the rates $\rho_k$ and $\rho_{k'}$ (and generally on a service quality metric). It is then possible for the powers allocated to the different transmission terminals to modify the interference system. In this case, it is possible to iterate the process for grouping couples into pairs, determining the interference and minimum power allocation zones, until one converges or a maximum number of iterations is reached. The convergence can for example be verified by comparing, relative to a threshold, the sum of the deviations between successive powers calculated over all of the transmitting terminals. The convergence criterion can be assessed for all of the pairs or independently, pair by pair.

In any case, after the pairs $(T_k, T_{k'})$ have been formed, the power diagrams are calculated for each of these pairs and the interference zone are identified in each of these diagrams. This operation can be done in a centralized manner by a dedicated node or distributed in the receiving terminals.

In any case, one skilled in the art will understand that the calculation can be done using a microprocessor, a specialized mathematical processor (DSP) or by reading in a ROM in which calculating results have previously been stored (look-up table).

The invention claimed is:

1. A communication method for a cellular telecommunications system including at least one first couple of terminals formed by a first transmitting terminal and a first receiving terminal and a second couple of terminals formed by a second transmitting terminal and a second receiving terminal, a first communication between the terminals of the first couple using the same radio resources as a second communication between the terminals of the second couple, such that the two communications interfere with each other, the communication method comprising:

estimating channel coefficients between said transmitting terminals and said receiving terminals;

determining an interference diagram for at least the first receiving terminal, the diagram being obtained for a first transmission power range of the first transmitting terminal and a second transmission power range of the second transmitting terminal, and for at least one couple of rates for the first and second communications;

for the considered couple of rates, determining a partition of the diagram into different zones, each zone corresponding to a distinct type of processing of the interference for at least the first communication;

selecting a zone of the partition containing an operating point of the first and second receiving terminals; and performing, at least in the first receiving terminal, processing for the interference corresponding to the zone selected by the selecting.

2. The communication method according to claim 1, further comprising: in a first type of processing, processing the interference as thermal noise to decode an information signal of the first communication.

3. The communication method according to claim 1, further comprising: in a second type of processing, joint decoding information signals of the first and second communications.

4. The communication method according to claim 1, further comprising: in a third type of processing,
decoding information signal of the second signal, determining an estimate of an interference signal due to the second communication therefrom, and subtracting the estimate from the signal received by the first receiving terminal, and decoding an information signal of the first communication from the signal thus obtained.

5. The communication method according to claim 1, further comprising: obtaining said operating point by minimizing power allocated to the first transmitting terminal for a given rate of the first communication.

6. The communication method according to claim 1, further comprising: obtaining said operating point by joint minimization of powers respectively allocated to the first and second transmitting terminals, under a stress pertaining to a first service quality metric.

7. The communication method according to claim 6, further comprising: obtaining said operating point by joint minimization of powers respectively allocated to the first and second transmitting terminals for given rates of the first and second communications.

8. The communication method according to claim 1, further comprising:

determining a plurality of partitions, and obtaining a zone by selecting one of said partitions maximizing, at the operating point, a utility function depending on the rate of the first communication.

9. The communication method according to claim 1, further comprising:

determining a plurality of partitions, and obtaining a zone by selecting one of said partitions maximizing, at the operating point, a utility function jointly depending on the respective rates of the first and second communications.

10. The communication method according to claim 9, wherein said utility function is the sum of the rates of the first and second communications.

11. The communication method according to claim 9, wherein said utility function is a minimum rate for the first and second communications.

12. The communication method according to claim 1, wherein said communication system includes a plurality of couples each formed by a transmitting terminal in communication with a receiving terminal, the communication method further comprising: grouping the couples together in pairs by selecting, for each first couple of terminals, a second couple of terminals of said plurality generating a strongest interference level on the communication between the terminals of the first couple, the first couple of terminals and the second couple of terminals then constituting a pair.

\* \* \* \* \*